United States Patent [19]

Hatakoshi et al.

[11] Patent Number: 5,113,469
[45] Date of Patent: May 12, 1992

[54] OPTICAL WAVELENGTH-CONVERTING DEVICE FOR GUIDED-WAVE SECOND-HARMONIC GENERATION IN CERENKOV RADIATION MODE

[75] Inventors: Genichi Hatakoshi, Yokohama; Kazutaka Terashima, Ebina; Masaru Kawachi; Yutaka Uematsu, both of Yokohama, all of Japan

[73] Assignee: Kabushiki Kaisha Toshiba, Kawasaki, Japan

[21] Appl. No.: 663,311

[22] Filed: Mar. 1, 1991

[30] Foreign Application Priority Data

Mar. 2, 1990 [JP] Japan .................................. 2-49462
Aug. 24, 1990 [JP] Japan .................................. 2-221282

[51] Int. Cl.$^5$ ........................... G02B 6/10; G02F 1/37
[52] U.S. Cl. ..................................... 385/122; 359/328; 359/332; 385/129; 385/131
[58] Field of Search ............... 350/96.12, 96.13, 96.14, 350/96.15, 96.29, 96.30; 307/425-430; 385/122; 359/326-332

[56] References Cited

U.S. PATENT DOCUMENTS

| 4,838,638 | 6/1989 | Kamiyama et al. | 307/427 X |
| 4,893,888 | 1/1990 | Okazaki et al. | 350/96.12 |
| 4,909,595 | 3/1990 | Okazaki et al. | 350/96.29 |
| 4,923,277 | 5/1990 | Okazaki et al. | 350/96.29 |
| 4,952,013 | 8/1990 | Harada et al. | 350/96.30 |
| 4,962,993 | 10/1990 | Okamoto et al. | 350/96.29 |

FOREIGN PATENT DOCUMENTS

2-187735 7/1990 Japan .

OTHER PUBLICATIONS

"Enhancement of the Guided-Wave Second-Harmonic Generation in the Form of Cerenkov Radiation", Appl. Phys. Lett., vol. 56, No. 3, jan. 15, 1990, K. Hayata et al., pp. 206-208.
"Quasi-Phase-Matched Second-Harmonic Generation of Blue Light in Periodically Poled LiNbO$_3$", Appl. Phys. Lett., vol. 56, No. 2, Jan. 8, 1990, G. A. Magell et al., pp. 108-110.
"Second-Harmonic Generation of Green Light in Periodically Poled Planar Lithium Niobate Waveguide", Electronics Letters, vol. 25, No. 3, Feb. 2, 1989, E. J. Lim et al., pp. 174-175.
"Blue Light Generation by Frequency Doubling in Periodically Poled Lithium Niobate Channel Waveguide", Electronics Letters, vol. 25, No. 11, May 25, 1989, E. J. Lim et al., pp. 731-732.

Primary Examiner—John D. Lee
Attorney, Agent, or Firm—Oblon, Spivak, McClelland, Maier & Neustadt

[57] ABSTRACT

An optical wavelength-converting device for generating the second-harmonic wave through Cerenkov radiation has a substrate made from nonlinear optical crystal which acts as a cladding layer. Formed on the top surface of the substrate is a long, narrow optical waveguide layer, whose refractive index is larger than that of the substrate. In the substrate, multi-layered domain-inverted sections are formed. With this arrangement, the nonlinear coefficient is locally changed, thereby compensating for phase mismatching between the fundamental wave and the second-harmonic wave in the direction perpendicular to the substrate's surface. This compensation helps improve the efficiency in converting the laser input light of the fundamental wave into the second-harmonic wave.

15 Claims, 15 Drawing Sheets

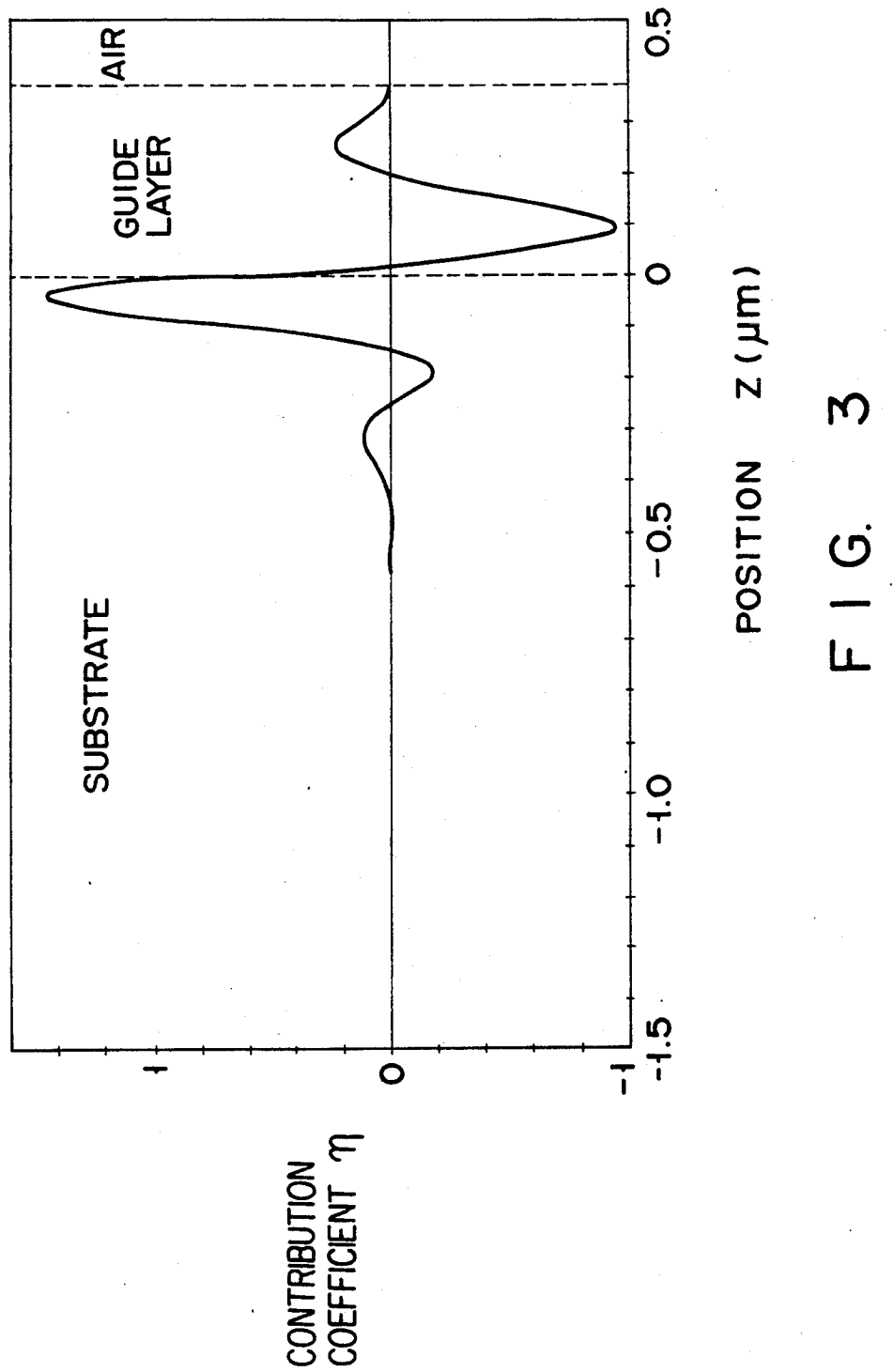
F I G. 3

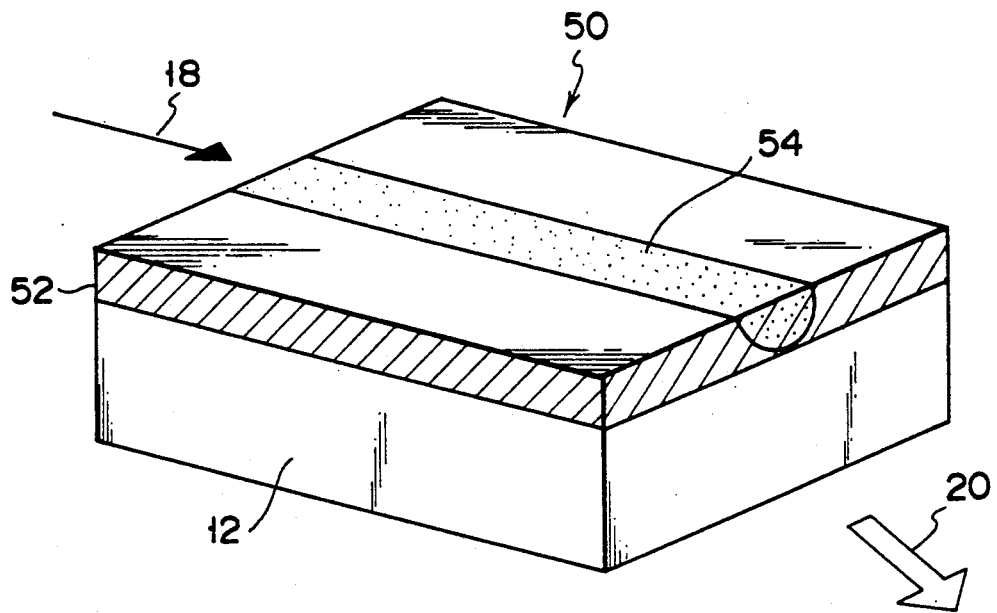
F I G. 4
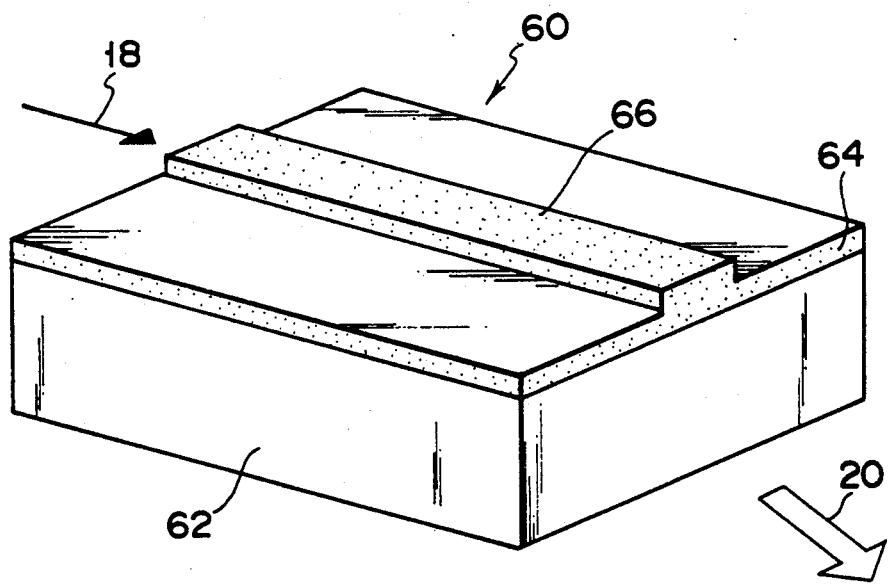
F I G. 5

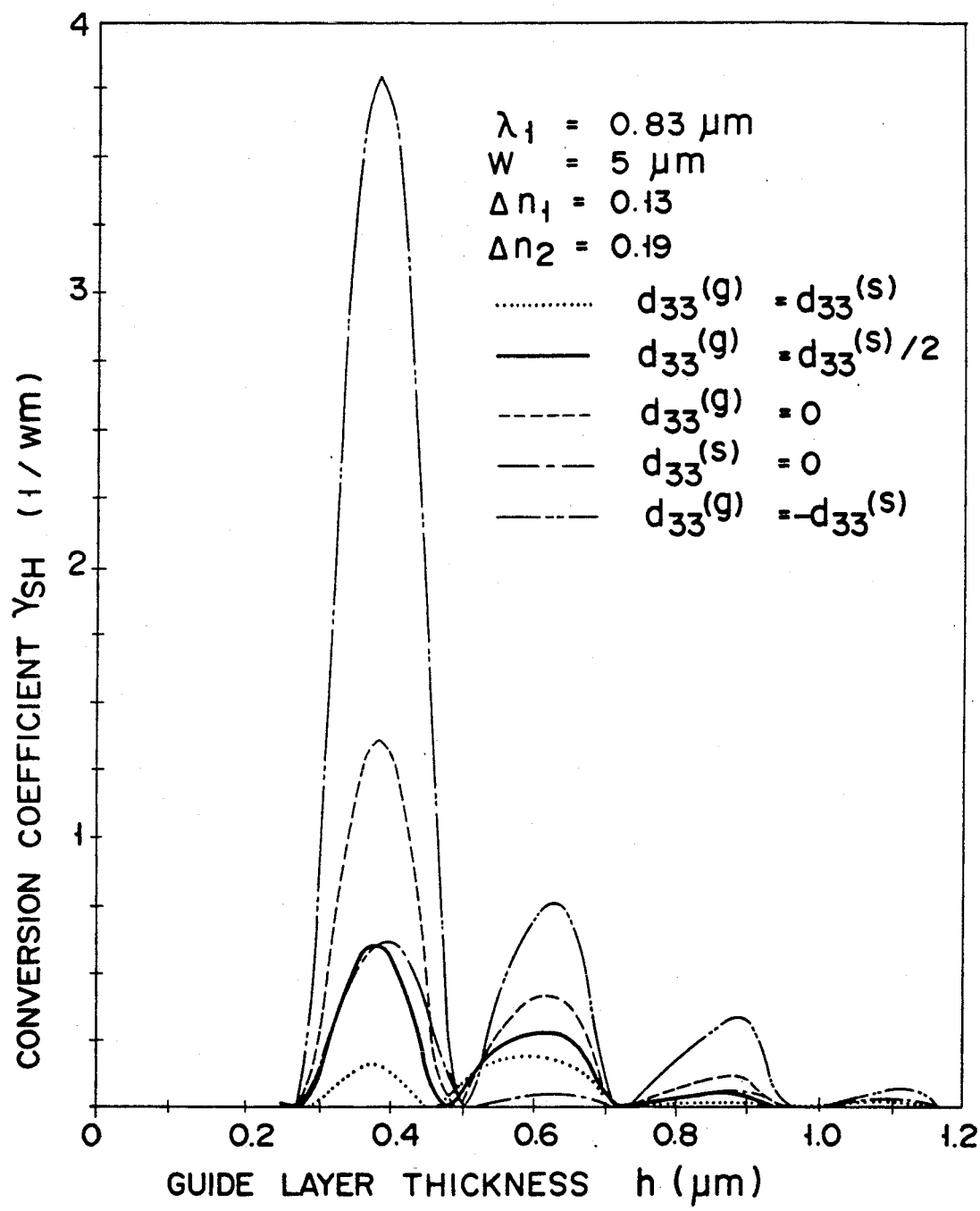
F I G. 6

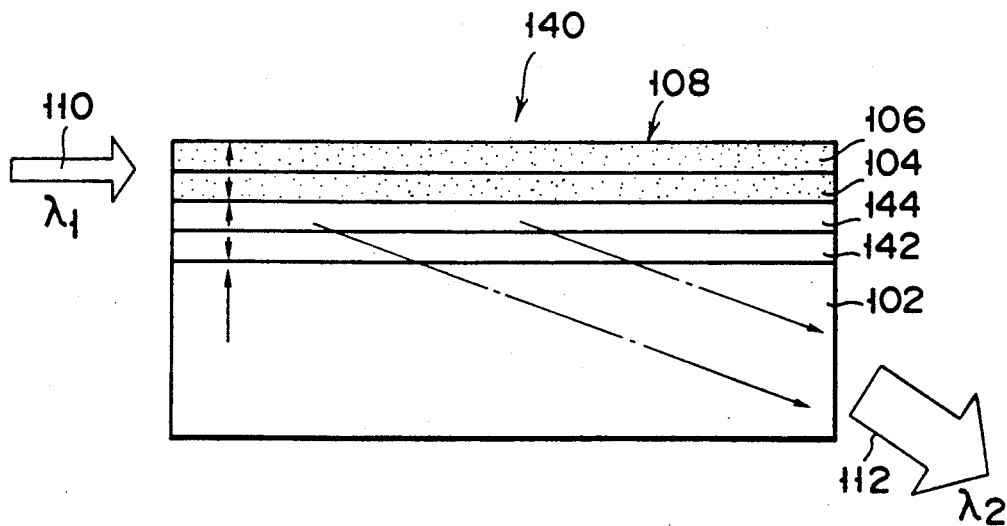
F I G. 12
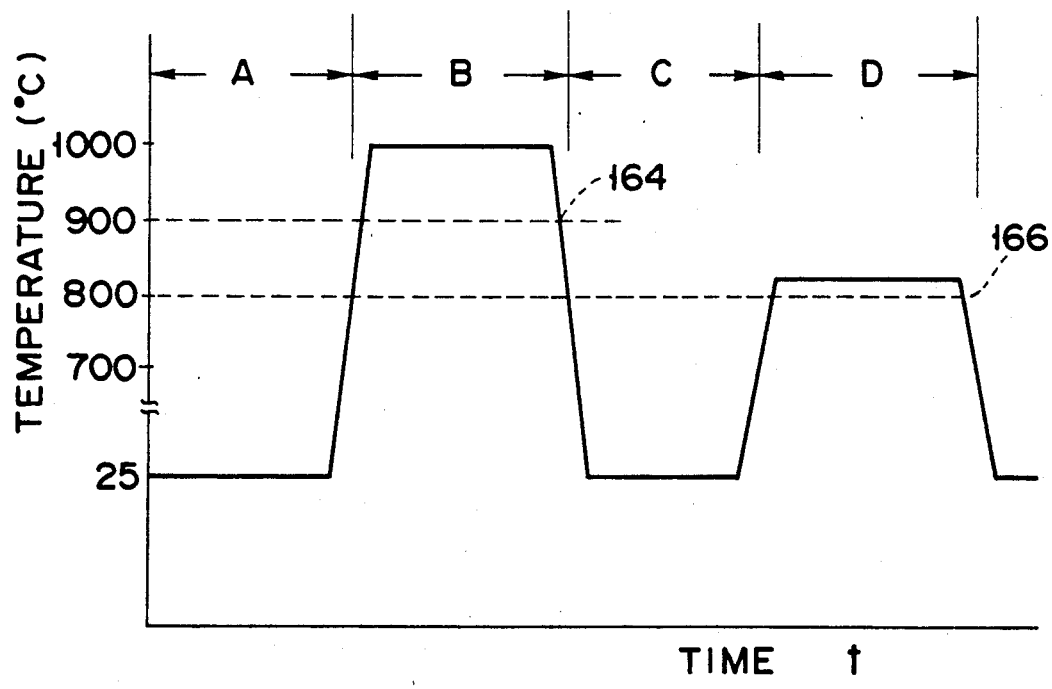
F I G. 15

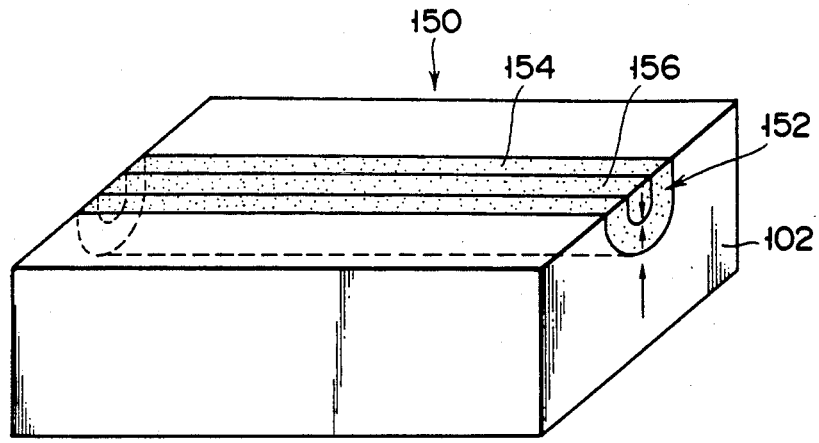
F I G. 13
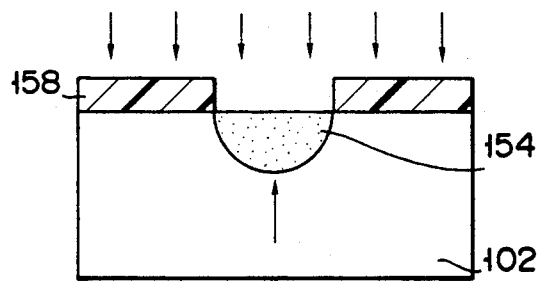
F I G. 14A
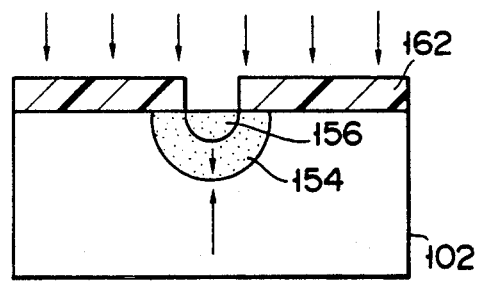
F I G. 14C
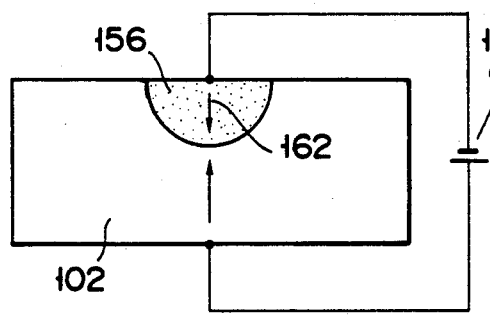
F I G. 14B
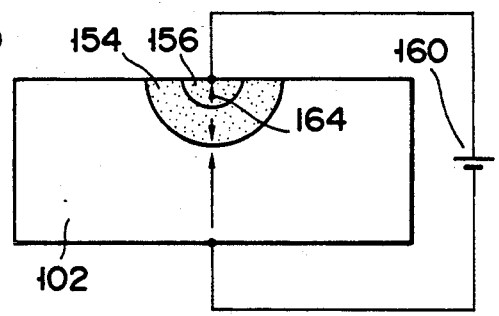
F I G. 14D

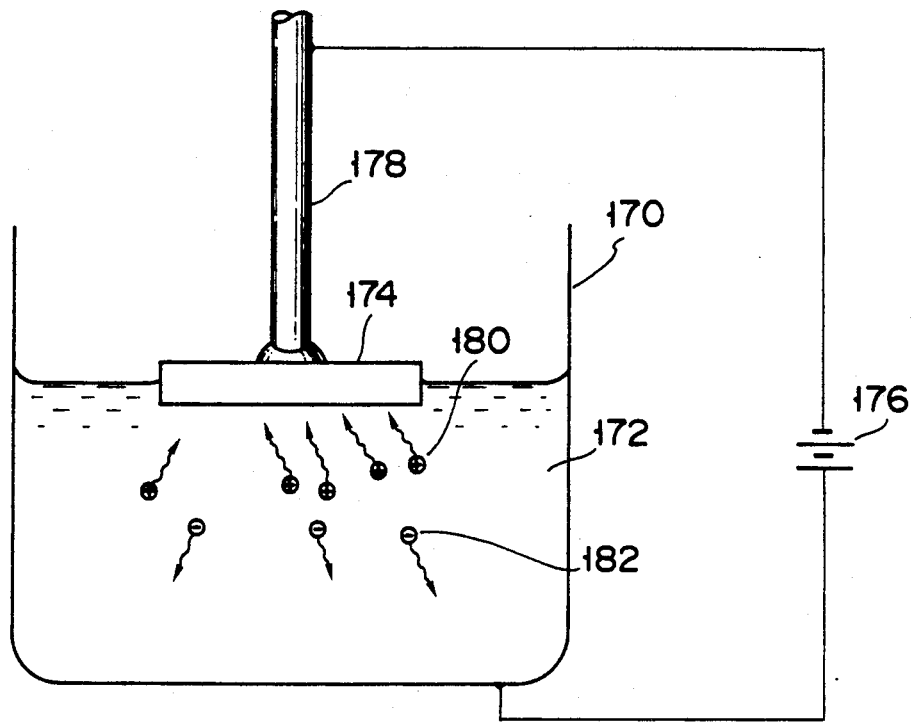
F I G. 16
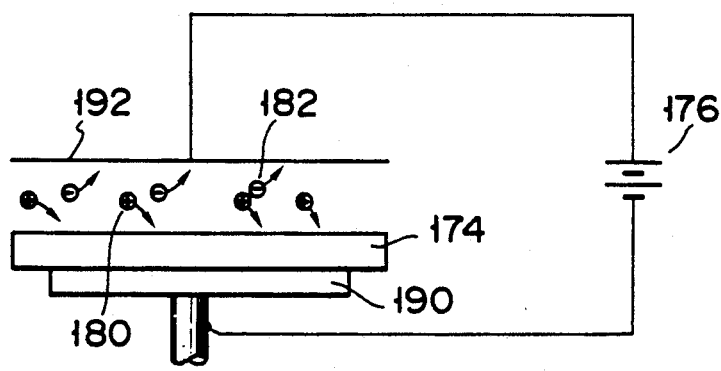
F I G. 17

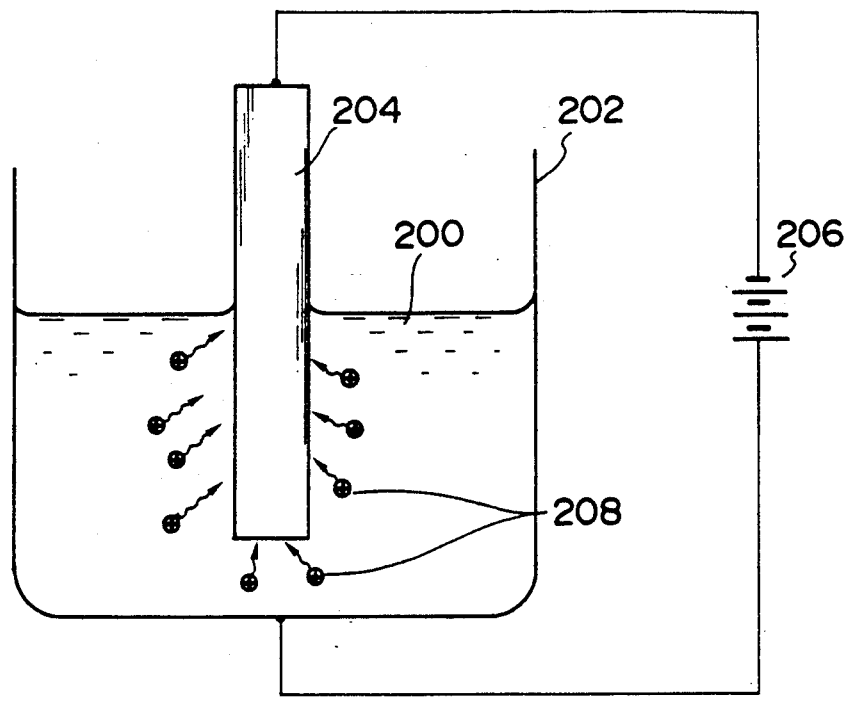
F I G. 18
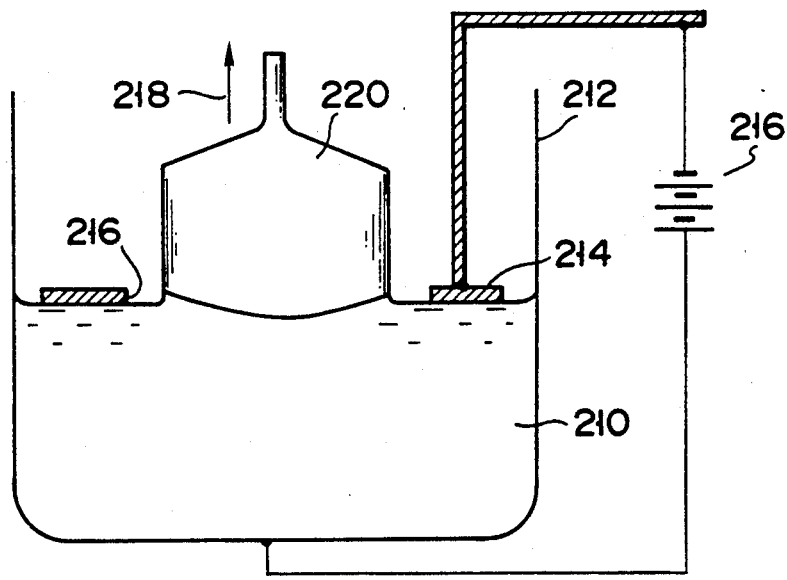
F I G. 19

OPTICAL WAVELENGTH-CONVERTING DEVICE FOR GUIDED-WAVE SECOND-HARMONIC GENERATION IN CERENKOV RADIATION MODE

BACKGROUND OF THE INVENTION

1. Field of the Invention

This invention relates to optical wavelength-converting devices using nonlinear optical materials, and more particularly to an optical waveguide device that allows guided-wave second-harmonic generation in Cerenkov radiation mode.

2. Description of the Related Art

Recently, many efforts have been devoted to researching and developing optical elements that generate the second-harmonic wave, by using nonlinear optical crystal, to obtain a short-wavelength light source. To make the light source smaller and less power-consuming, continual attempts have been made to use semiconductor laser in generating the fundamental wave and to form an optical wavelength in the optical crystal wave. The nonlinear optical crystal used is arranged so as to define a stripe-shaped optical waveguide on the top surface of the substrate.

A typical optical wavelength-converting device of this type is disclosed in the article "Second harmonic generation using proton-exchanged $LiNbO_3$ waveguide", by T. Taniuchi et al., Optoelectronics, 1987, Vol. 2, No. 1, p.53-58. With the arrangement shown in this literature, semiconductor laser light is first produced as the fundamental wave, which is then converted into a second-harmonic wave (e.g., blue light) radiated within the substrate as a Cerenkov radiation wave. The second-harmonic wave radiates diagonally downward with respect to the propagation direction of the fundamental wave, which is propagated in the guiding direction of the waveguide formed on the substrate.

Such conventional Cerenkov radiation-mode optical wavelength-converting devices, however, have poor conversion efficiency. The reason for this is considered as follows: while the phase-matching condition between the fundamental wave and the second-harmonic wave can be completely satisfied along the propagation direction of the fundamental wave in the second-harmonic wave Cerenkov radiation, the phase-matching condition cannot always be satisfied along the vertical direction perpendicular to the substrate's surface. Such phase-mismatching reduces the radiation efficiency of the second harmonic wave considerably.

The generation of such crystalline phase mismatching is closely related to the physical layer structure of a waveguide, including the material, depth, and width. In general, the physical layer structure of the waveguide in a Cerenkov-type optical wavelength-converting device is designed mainly to fulfill conditions for the generation of the second-harmonic wave, the conditions being known as the Cerenkov conditions. It is not allowed to modify the waveguide parameter in such a way that its design does not meet the Cerenkov conditions. That is, the waveguide cannot be designed freely to prevent the phase mismatching; improvements in the waveguide structure for no mismatching has to be strictly limited in terms of flexibility. This means that a complete removal of the phase-mismatching is intrinsically difficult. With this backdrop, attempts to increase the optical conversion efficiency to the desired level has been successful only in extremely limited range.

SUMMARY OF THE INVENTION

It is therefore an object of the present invention to provide a new and improved optical wavelength-converting device with a high conversion efficiency.

In accordance with the above object, the present invention is addressed to provide a specific optical wavelength-converting device having a substrate made from optical crystal and a waveguide section formed in the substrate with its refractive index lager than that of the substrate, at least one of the substrate and waveguide section having a nonlinear optical material region made from nonlinear optical crystal material, the nonlinear coefficient being changed in at least part of the region to compensate for phase-mismatching between a guided fundamental wave and a second-harmonic radiation wave in the direction essentially perpendicular to the waveguide section.

The present invention is still addressed to provide a wavelength-converting device which has a substrate made from optical crystal and an optical waveguide section with its refractive index larger than that of the substrate, at least one of the substrate and the waveguide section being made from nonlinear optical crystal material, the sign of the nonlinear coefficient being changed in at least part of the waveguide section, and such local change of the sign of the nonlinear coefficient being achieved by forming domain-inverted regions through the Curie temperature difference.

The forgoing and other objects, features and advantages of the invention will become more apparent in the detailed description of preferred embodiments presented hereinafter.

BRIEF DESCRIPTION OF THE DRAWINGS

In the detailed description of preferred embodiments of the present invention that follows, reference is made to the accompanying drawings in which:

FIG. 3 is a characteristic diagram showing variations in the conversion efficiency coefficient with respect to position in the vertical direction of the device's waveguide layer, which is used to explain the principle of improving the conversion efficiency of an optical wavelength-converting device of the present invention;

FIG. 4 is an overall perspective view of an optical wavelength-converting device in accordance with a second embodiment of the present invention;

FIG. 5 is an overall perspective view of an optical wavelength-converting device according to a third embodiment of the present invention;

FIG. 6 is a diagram showing the results of actually calculating variations in the conversion efficiency coefficient $\gamma_{SH}$ with respect to the waveguide section's nonlinear coefficient $d_G$, through computer simulation techniques;

FIG. 12 is a schematic diagram showing the sectional structure of an important part of an optical wavelength-converting device according to a sixth embodiment of the present invention;

FIG. 13 is a schematic diagram illustrating the sectional structure of a major part of an optical wavelength-converting device in accordance with a seventh embodiment of the present invention;

FIGS. 14A through 14D are diagrams illustrating primary sectional structures obtained from major manufacturing processes for the optical wavelength-converting device of FIG. 13;

FIG. 15 is a diagram generally showing setting temperature changes with respect to elapsed time regarding the manufacturing processes in FIGS. 14A through 14D;

FIG. 16 is a sectional view for an important part of manufacturing equipment, which is used to explain an embodiment related to a method of manufacturing the aforementioned devices embodying the present invention;

FIG. 17 is a sectional view for an important part of manufacturing equipment, which is used to explain another embodiment in connection with a method of manufacturing the aforesaid devices embodying the present invention;

FIG. 18 is a sectional view for an important part of manufacturing equipment, which is used to explain still another embodiment related to a method for manufacturing the aforementioned devices embodying the present invention;

FIG. 19 is a sectional view for a main part of manufacturing equipment, which is used to explain a further embodiment related to a method of manufacturing the afore mentioned devices embodying the present invention;

DETAILED DESCRIPTION OF THE PREFERRED EMBODIMENTS

Figure 1:
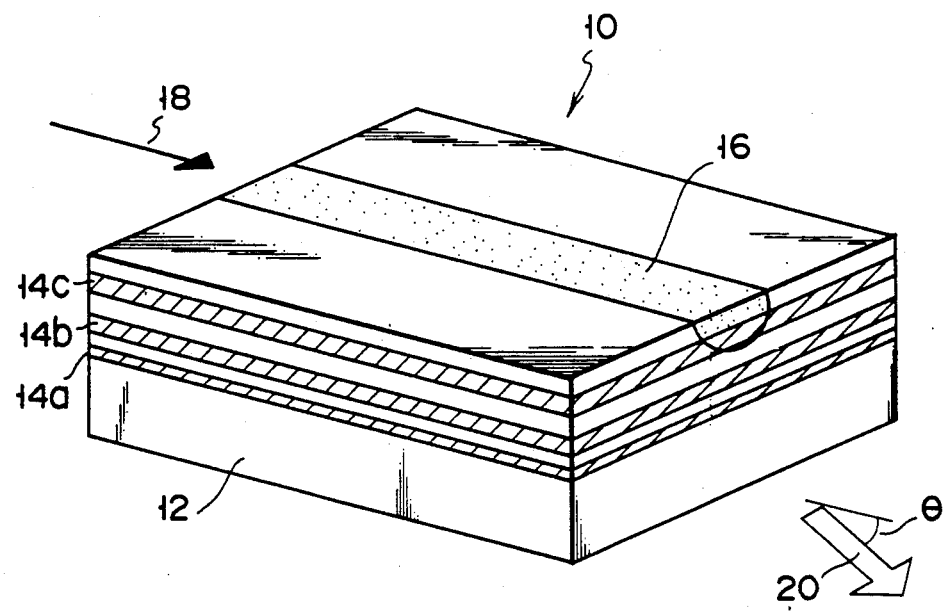
FIG. 1 is an overall perspective view of an optical wavelength-converting device according to a first embodiment of the present invention.

In FIG. 1, an optical wavelength-converting device according to a preferred embodiment of the present invention, suitable for a blue light source, is generally designated by reference character "10." This optical device 10 has a substrate 12 made from nonlinear optical crystal. Over the upper portion of the substrate 12, 10 a plurality of domain inversion layers 14a, 14b, and 14c are formed, which constitute a multilayered domain inversion portion 14. The existence of the domain inversion layers 14a, 14b, and 14c allows the sign of the nonlinear coefficient of the substrate 12 to vary in the perpendicular direction thereto. Formed above the top surface of the substrate 12 is an elongated channel-shaped optical waveguide layer 16, whose refractive index is larger than that of the substrate 12. The waveguide layer 16 has a semicircular cross section for example. In FIG. 1, the waveguide layer 16 is visually distinguished from the rest by shading it with dots.

When semiconductor laser light 18 with a selected wavelength of $\lambda_1$, which serves as the fundamental wave, is externally incident to the input end of the waveguide layer 16 of the optical wavelength-converting device 10, the second-harmonic wave is generated or radiated within the substrate 12 as a result of what is known as the nonlinear optical effect. The wavelength $\lambda_2$ of the second-harmonic wave is essentially half of the fundamental wave's wave length $\lambda_1 (\lambda_2 = \lambda_1/2)$. The configuration shown in FIG. 1, wherein the second harmonic wave is generated as a substrate radiation wave, is called the "Cerenkov-radiation type second harmonic generation" in the technical field to which the invention pertains. The second-harmonic wave radiates diagonally downward from the output end of the substrate 12 as shown in FIG. 1. In other word, the second-harmonic wave 20 radiates downward at an angle 8 to the propagation direction of the fundamental wave, which is propagation as a guided mode along the waveguide layer 16.

The effective refractive index $n_G$ of the waveguide layer 16 is determined as follows: if the refractive indices for wavelengths $\lambda_1$ and $\lambda_2$ of the substrate 12 are n1 and n2, respectively, and the effective refractive index of the waveguide composed of each part of the waveguide layer 16 and substrate 12 is $n_{EFF}$, the refractive index $n_G$ of the waveguide layer 16 is specially selected so that the effective refractive index $n_{EFF}$ fulfills the following conditions:

$$n1 < n_{EFF} < n2 \quad (1)$$

Figure 2:
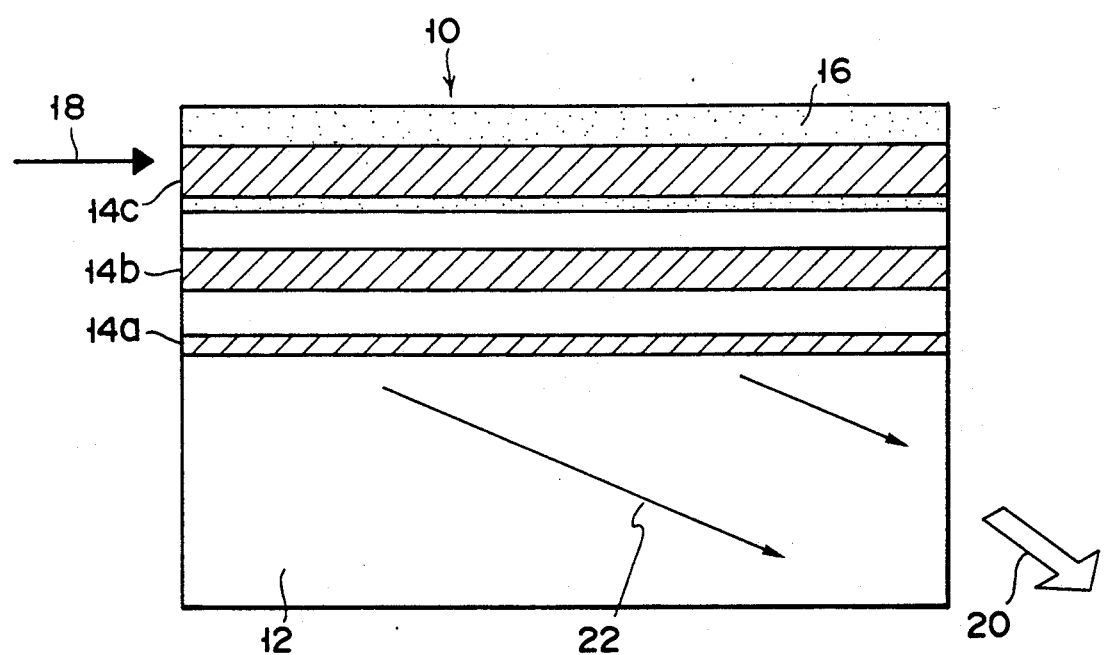
FIG. 2 is a schematic diagram showing the sectional structure of a main part of the optical wavelength-converting device of FIG. 1.

The sectional structure of the optical wavelength-converting device 10 of FIG. 1 is illustrated in detail in FIG. 2. Second harmonic wave generated as Cerenkov radiation wave within the substrate 12 is indicated by reference character 22. In this sectional structure, the refractive index of the substrate 12 is the same throughout its internal region but its nonlinear coefficient varies with portion. Similarly, the refractive index of the waveguide layer 16 is the same throughout its internal region but its nonlinear coefficient changes with portion. In this embodiment, the absolute value of the nonlinear coefficient remains unchanged over the entire region of the substrate 12, whereas in the region containing the domain inversion layers 14a, 14b, and 14c, the sign of the nonlinear coefficient is opposite to that of other regions.

With the optical wavelength-converting device 10 thus constructed, the phase mismatching between the fundamental wave and the second-harmonic wave in the direction perpendicular to the wave guide layer 16 can be satisfactorily compensated for by local changes in the nonlinear coefficient, which are caused by the existence of the domain inversion layers 14a, 14b, and 14c, and the waveguide layer 16 in the substrate 12. Consequently, the radiation efficiency of the second-harmonic wave 20 is preferably improved without interfering with the Cerenkov condition of the optical wavelength-converting device, given by Equation (1).

The principle of improving the radiation efficiency of the present invention will now be explained.

In the case of the Cerenkov radiation-type SHG, the electric fields $E_1$ and $E_2$ of the fundamental and second-harmonic waves are given in the form of guided mode and radiation mode. They are expressed by the following expressions:

$$E_1 \propto \exp(-i\beta_1 x) F_1(z) \quad (2)$$

$$F_1(z) = \begin{cases} \cos\phi_{A1}\exp[-\gamma_{A1}(z-h)], & h \leq z \\ \cos(\kappa_{G1}^2 - \phi_{S1}), & 0 \leq z \leq h \\ \cos\phi_{S1}\exp(\gamma_{S1}^2), & z \leq 0 \end{cases} \quad (3)$$

$$k_{01}^2 n_{A1}^2 + \gamma_{A1}^2 = k_{01}^2 n_{G1}^2 - \kappa_{G1}^2 \quad (4)$$
$$= k_{01}^2 n_{S1}^2 + \gamma_{S1}^2$$
$$= \beta_1^2$$

$$\beta_1 = k_{01} n_{EFF} \quad (5)$$

$$k_{01} = 2\pi/\lambda_1 \quad (6)$$

$$E_2 \propto \exp(-i\beta_2 x) F_2(z) \quad (7)$$

$$F_2(z) = \begin{cases} A_A \exp[-\gamma_{A2}(z-h)], \\ z \geq h \\ A_G(z)\exp(i\kappa_{G2}z) + B_G(z)\exp(-i\kappa_{G2}z), \\ 0 \leq z \leq h \\ A_S(z)\exp(i\kappa_{S2}z) + B_S(z)\exp(-i\kappa_{S2}z), \\ z \leq 0 \end{cases} \quad (8)$$

$$k_{02}^2 n_{A2}^2 + \gamma_{A2}^2 = k_{02}^2 n_{G2}^2 - \kappa_{G2}^2 \quad (9)$$
$$= k_{02}^2 n_{S2}^2 + \kappa_{S2}^2$$
$$= \beta_2^2$$

$$k_{02} = 2\pi/\lambda_2 \quad (= 2k_{01}) \quad (10)$$

In the Cerenkov radiation-type SHG, phase matching is automatically satisfied in the propagation direction (the x direction) of the fundamental wave. This is expressed by:

$$\beta_2 = 2\beta_1 \quad (11)$$

However, phase-matching condition in the layer direction (the z direction) is not fulfilled. As can be seen from equations (4) through (6), (9), and (10), it is impossible to meet the conditions in equation (11) and the phase matching conditions in the z direction (e.g., $\kappa_{G2} = 2\kappa_{G1}$) at the same time. Thus, such phase mismatching in the z direction limits the conversion efficiency in the Cerenkov-type second harmonic generation.

FIG. 3 shows the results of calculating a contribution coefficient $\eta$ to the conversion efficiency with respect to place in the z direction in the conventional Cerenkov radiation-type SHG. As seen from the figure, the sign of $\eta$ is inverted at some places, with the result that a contribution to the conversion efficiency is offset or cancelled on the whole. Use of a structure in which the sign of nonlinear coefficient is reversed at places where the contribution sign is revered would improve the conversion efficiency substantially. The embodiments shown in FIGS. 1 and 2 each have a structure in which the sign of the nonlinear coefficient is inverted at places where the sign of $\eta$ is inverted The aforementioned embodiment may be modified as shown in FIG. 4. In this figure, similar parts to those in FIG. 1 are indicated by similar reference characters and the repetition of their explanations will be avoided.

An optical wavelength-converting device 50 has a substrate 12, the nonlinear coefficient of which is the same in its absolute value throughout the substrate 12 but opposite in its sign at its upper region (the shaded portion with slanted lines in FIG. 4) and its lower region (the substrate's main body). A waveguide layer 54 is formed at the substrate's upper region 52. The prediction that just changing the sign of the nonlinear coefficient of the waveguide section improves the conversion efficiency proves reasonable based on the following facts: (1) In the characteristic diagram in FIG. 3, contribution coefficient $\eta$ changes its sign in the vicinity of the interface between the substrate and the waveguide section; and (2) also in the same vicinity, its absolute value becomes larger. In practice, however, some materials and/or structure used in an optical wavelength-converting device make it difficult to change the nonlinear coefficient's sign locally, in which case, the structure shown in FIG. 4 is useful.

In the case where even changing the nonlinear coefficient's sign is difficult, just setting the nonlinear coefficient of the slanted-line region 52 of FIG. 4 to zero (i.e., the nonlinear coefficient of the waveguide layer 45 is also seen to be zero) will make a practical contribution to the improvement of the conversion efficiency. Specifically, when the sign of the nonlinear coefficient remains unchanged or constant over the entire region of the substrate 12, the contribution coefficient $\eta$ of the substrate's main portion cancels out that of the waveguide section. Thus, making the nonlinear optical coefficient zero in at least a local portion improves the conversion efficiency.

An optical wavelength-converting device according to a third embodiment of the present invention is designated by reference character 60 in FIG. 5. A substrate 62 is composed of nonlinear optical crystal. Formed on the upper region of the substrate 62 is a layer 64 with a long, narrow protrusion 66 of stripe-shape, which is made from optical crystal material whose nonlinear coefficient is essentially zero. The protrusion 66 defines a waveguide section. The refractive index for each of the substrate 62 and waveguide section 66 is determined by expression (1) described above. With this arrangement, the application of the fundamental wave 18 produces the second-harmonic wave 20 at the output end of the device 60 with the conversion efficiency higher than conventional counterparts.

The diagram in FIG. 6 illustrates the results of actually calculating variations in the conversion efficiency coefficient $\gamma_{SH}$ with respect to the nonlinear optical coefficient $d_G$ of the waveguide section through computer simulation techniques, in the embodiments of the present invention. As obvious from the figure, with the depth h of the waveguide layer being 0.4 micrometers, for example, when its nonlinear optical coefficient $d_G$ is identical with that of the substrate ($d_s$), the conversion efficiency $\gamma_{SH}$ is minimum. In this situation, when the nonlinear coefficient $d_G$ of the waveguide section was zero, the conversion efficiency coefficient $\gamma_{SH}$ was 9 times as large, and when the sign of the nonlinear coefficient $d_G$ is opposite to that of the substrate 12, it was surprisingly 24 time as large.

Although a simple three-layered waveguide is used in the embodiments described above, the present invention is not restricted to this and may be applied to any other multi-layered waveguide. In this case, contribution coefficient $\eta$ to the conversion efficiency is calculated as shown in FIG. 3 and the sign of the nonlinear optical constant is inverted at places where the contribution coefficient's sign is inverted, or the arrangement is made so that the nonlinear optical constant becomes nearly zero at such places.

Figure 7:
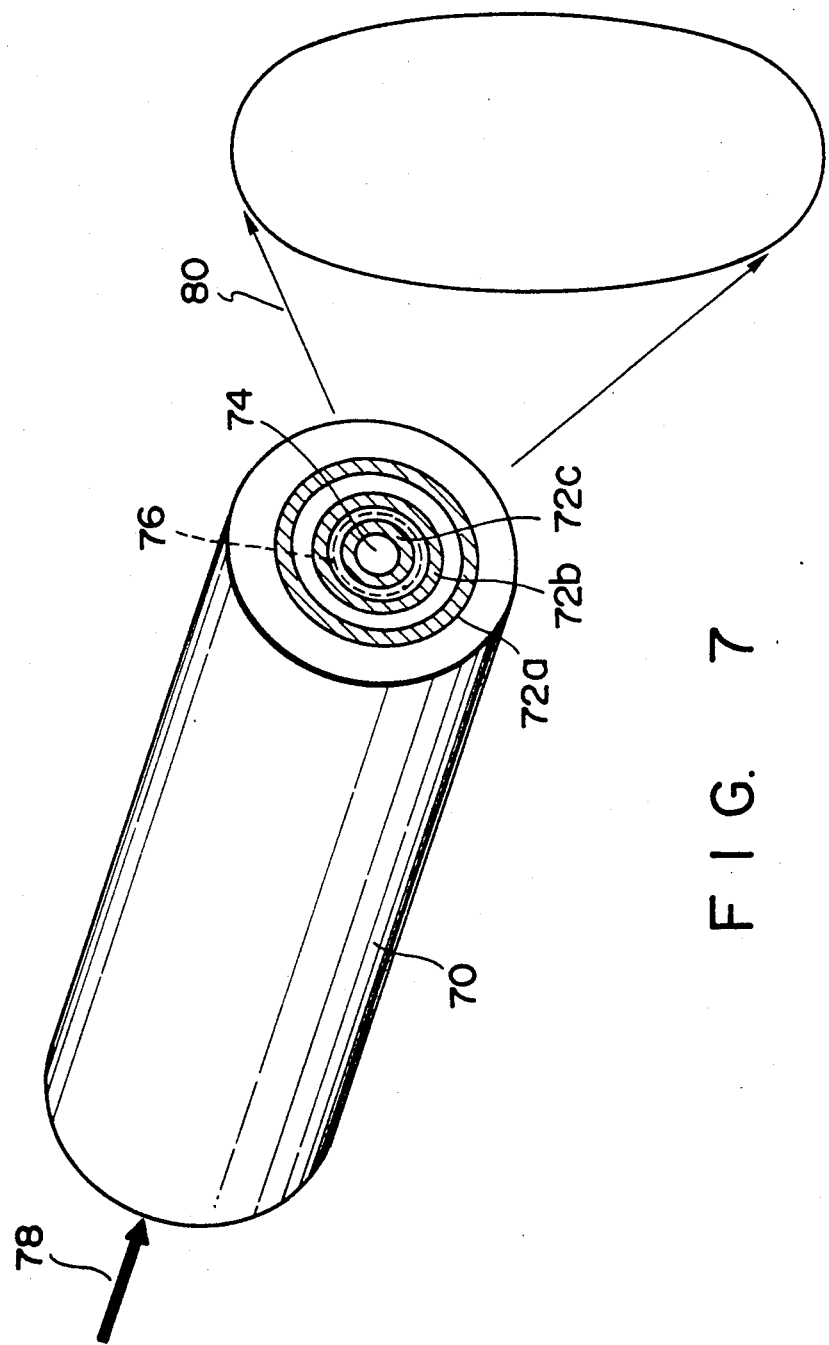
FIG. 7 is a diagram showing the sectional structure of a main part of an optical wavelength-converting device according to a fourth embodiment of the present invention.

The present invention is not limited to a slab wave guide and is also applicable to the generation of the second-harmonic wave by Cerenkov radiation using other three-dimensional waveguides. FIG. 7 shows a fourth embodiment of the present invention in which the second-harmonic wave is generated by Cerenkov radiation using an optical-fiber waveguide. In this embodiment, a cylindrical cladding layer 70 is made from nonlinear optical crystal. Formed within the cladding layer are tube-like domain-inverted nonlinear optical crystal regions 72a, 72b, and 72c that are concentric with each other, wrapped around one on top of another. In this arrangement, the innermost central region 74 indicated by a broken line 76 corresponds to a waveguide section. Reference character 78 designates laser light of the fundamental wave applied externally and 80 the second-harmonic wave output.

With the optical wavelength-converting devices according to the embodiments descried above, the conversion efficiency can be improved by locally changing the nonlinear optical coefficient in its absolute value and/or sign within the nonlinear optical material substrate in generating the second-harmonic wave through Cerenkov radiation. Such changes in the nonlinear optical coefficient can be obtained easily and successfully without any interference with the Cerenkov radiation conditions. Accordingly, the concept of the present invention provides long-awaited solutions to the above problems at a stroke, which will probably be quite helpful to semiconductor manufactures.

The inversion of the nonlinear coefficient's sign may also be accomplished by inverting the crystal domain. Some structures employing this concept will be presented below.

Figure 8:
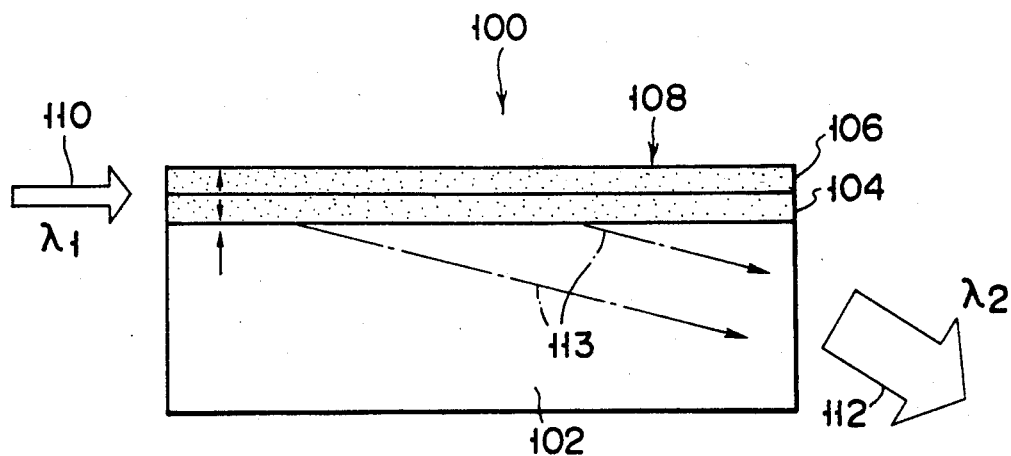
FIG. 8 is a schematic diagram showing the sectional structure of a main part of an optical wavelength-converting device according to a fifth embodiment of the present invention.

In FIG. 8, an optical wavelength-converting device 100 has a substrate 102 made from nonlinear optical material such as $LiNbO_3$ (hereinafter abbreviated as LN) crystal. Stacked in sequence on the substrate 102 are a first and second dielectric layers 104 and 106, which constitute an optical waveguide layer 108. The effective refractive index $n_G$ of the waveguide layer 108 is set so as to meet the aforementioned conditional expression (1). It should be noted that in FIG. 8, an arrow in each of the layers 102, 104, and 106 indicates the direction of crystal axis in a corresponding layer.

The first and second dielectric layers 104 and 106 differ in their Curie temperature, which allows crystal axis to be inverted in at least part of the crystal axis waveguide layer 108. More specifically, the crystal axis of the first dielectric layer 104 is opposite in direction to that of the substrate 102, while the crystal axis direction of the second dielectric layer 106 is the same as that of the substrate 102. With this configuration, when laser light 110 of the fundamental wave with a wavelength of $\lambda$ is externally applied to one end of the optical waveguide layer 108 in the optical wavelength-converting device 100, the second-harmonic wave of a $\lambda_2 (= \lambda_1/2)$ wavelength is radiated along the arrow 113 in the substrate 102, in the form of Cerenkov radiation light as a result of the nonlinear optical effect. Then, the second-harmonic wave 112 is emitted at the other end of the substrate 102.

As described above, the conversion efficiency is improved in the arrangement where the direction of crystal axis is inverted in at least part of the waveguide layer 108. The mechanism behind this will be explained below.

Figure 9:
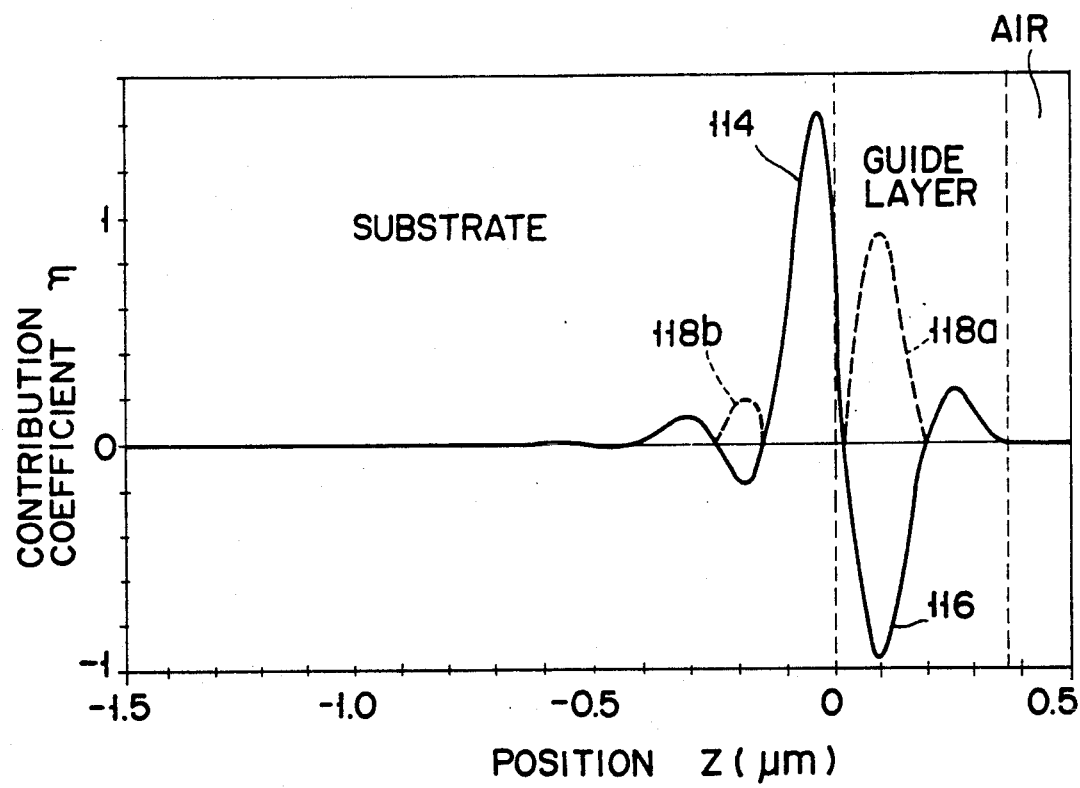
FIG. 9 is a characteristic graph showing variations in the conversion efficiency coefficient with respect to position in the vertical direction of the device's waveguide layer, which is used to explain the principle of improving the conversion efficiency of an optical wavelength-converting device of the present invention.

A characteristic diagram, which is rather similar to that of FIG. 3, is shown again in FIG. 9, which illustrates variations in conversion-efficiency contribution coefficient $\eta$ with respect to place in the depth direction of the waveguide layer in a Cerenkov radiation-type second-harmonic wave generating device. As shown by a solid line 114 in FIG. 9, the sign of coefficient $\eta$ is change significantly in the vicinity of the interface between the substrate 102 and optical waveguide layer 108. Specifically, the sign of coefficient $\eta$ has a positive polarity on the substrate's side of the interface region, while it makes a sudden change to have a negative polarity on the waveguide layer's side as shown by a solid line 116. Such inversion of the sign of contribution coefficient $\eta$ results in the canceling out of contribution coefficient $\eta$ in both regions (of the substrate and the waveguide layer), which reduces the conversion efficiency for the entire device 100. In this situation, when a domain inversion region is set within the waveguide layer 108 as described above, changes in the contribution coefficient $\eta$ with respect to position z are modified as shown by a broken line 118a in FIG. 9. That is, the sharp change 116 toward negative polarity in the waveguide layer region is inverted so as to make its mirror-like image in positive polarity as shown by a positive-variation curve 118a. As a result, no canceling out of the contribution coefficient $\eta$ for the substrate 102 and waveguide layer 108 takes place, which results in a substantial improvement in the conversion efficiency for the entire optical wavelength-converting device 100.

The domain inversion in the substrate, which is represented by a dashed line 118b in FIG. 9, has also an effect on the improvement in the conversion efficiency. An example of such a structure will be presented later in this description.

A method of manufacturing the optical wavelength-converting device 100 having the dielectric layers 104 and 106 of FIG. 8 will be explained, referring to FIGS. 10A through 10E.

It is generally known among those skilled in the art that the Curie temperature of dielectric crystal varies with the crystal composition ratio and the existence of impurities. For instance, in LN crystal, changing the ratio of the number of Li atoms to that of Nb atoms results in a change in the Curie temperature.

Figure 10A:
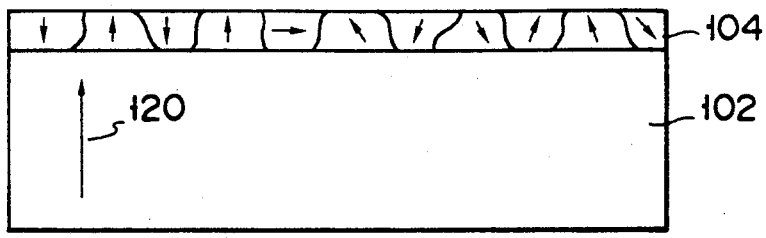
FIGS. 10A through 10B are diagrams illustrating primary sectional structures obtained from major manufacturing processes of the optical wavelength-converting device of FIG. 8.

In this embodiment, first, a substrate 102 made from MgO-deped LN crystal, whose crystal axis is indicated by reference numeral 120, is prepared as shown in FIG. 10A. On the substrate 102, a first dielectric layer 104 is grown to a thickness of nearly 0.2 micrometers at, for example, 800° C. by the liquid phase epitaxial technique using $V_2O_5$ as flux. At this point, the direction of crystal axis in the dielectric layer 104 differs from place to place as shown in FIG. 10A. The LN substrate 102 has a high Curie temperature, so that its crystal axis remains unchanged under the same temperature conditions.

Figure 10B:
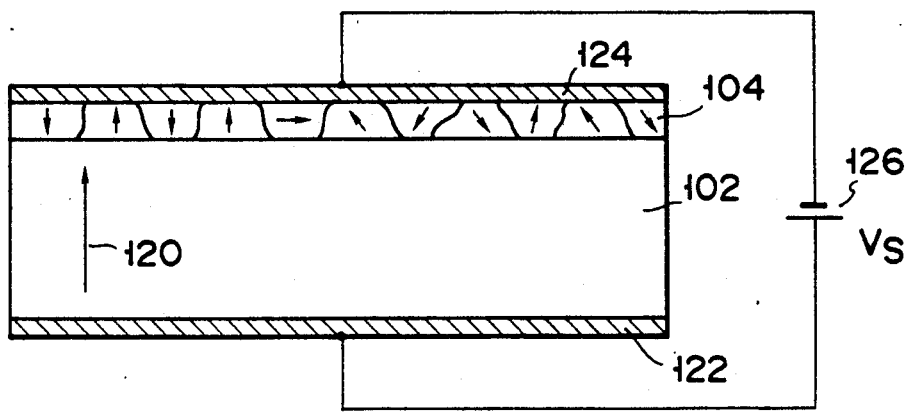
Figure 10C:
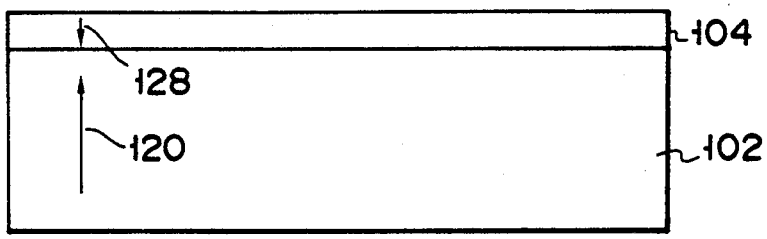

Then, metal films 122 and 124 are formed on each of the substrate 102 and dielectric layer 104, respectively, as shown in FIG. 10B. A direct-current (DC) power supply 126 applies a preselected DC voltage $V_S$ across these metal films 122 and 124, which produces a correspondingly strong electric field within the substrate 102 and dielectric layer 104. In this state, heat treatment is performed for 3 to 5 hours at a temperature higher than the Curie point of the dielectric layer 104 but lower than that of the substrate 102, for example, at 500° C. After this, these metal films 122 and 124 are removed. It is easy to make the dielectric layer 104 Nb-rich crystal by previously controlling the Li-to-Nb ratio in flux used. Composed of such crystal, the dielectric layer 104 has a low Curie temperature, which allows a 500° C. heat treatment to easily cause the rearrangement of crystal axis in the same direction but opposite to that of the substrate 102, as indicated by an arrow 128 in FIG. 10C.

Figure 10D:
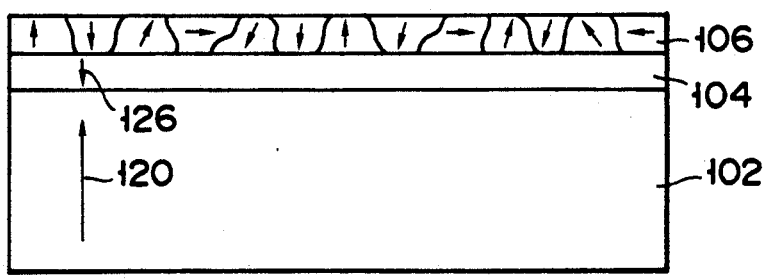

Then, as shown in FIG. 10D, on the first dielectric layer 104, a second dielectric layer 106 is grown using the liquid phase epitaxial technique. This second dielectric layer 106 is made more excessive in Nb than the first dielectric layer 104, thereby causing its Curie temperature to be lower than that of the latter.

Figure 10E:
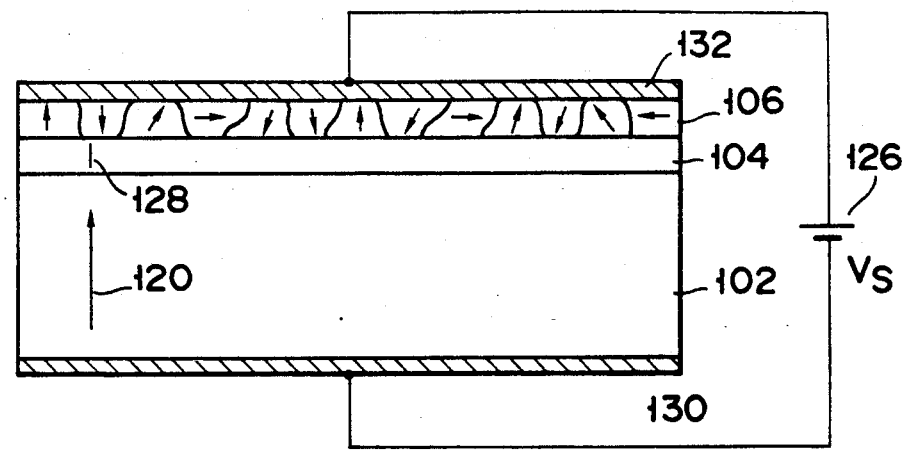

After this, as shown in FIG. 10E, on each of the substrate 102 and second dielectric layer 106, a pair of metal films 130 and 132 are formed. The DC power supply 126 is connected across these electrodes 130 and 132, which permits a DC voltage $V_S$ to be applied across the substrate 102 and dielectric layer 106. In this condition, heat treatment is carried out for 3 to 5 hours at a temperature higher than the Curie point of the second dielectric layer 106 but lower than that of the first dielectric layer 104, for example, at 400° C. At this time, the crystal axis in the first dielectric layer 104 remains unchanged, while the crystal axis in the second dielectric layer 106 changes to have the direction shown by an arrow 134 that has the same direction as the substrate 102.

Figure 11A:
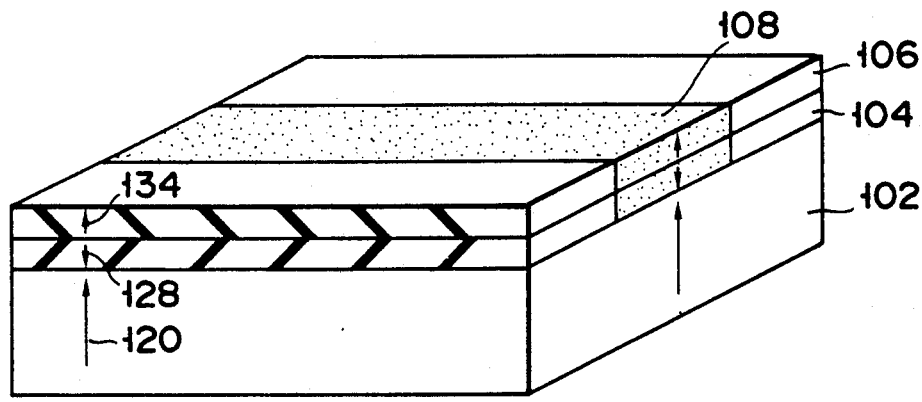
FIG. 11A is a perspective view for a type of an optical wavelength-converting device manufactured using the stacked structure produced in FIG. 10E.
Figure 11B:
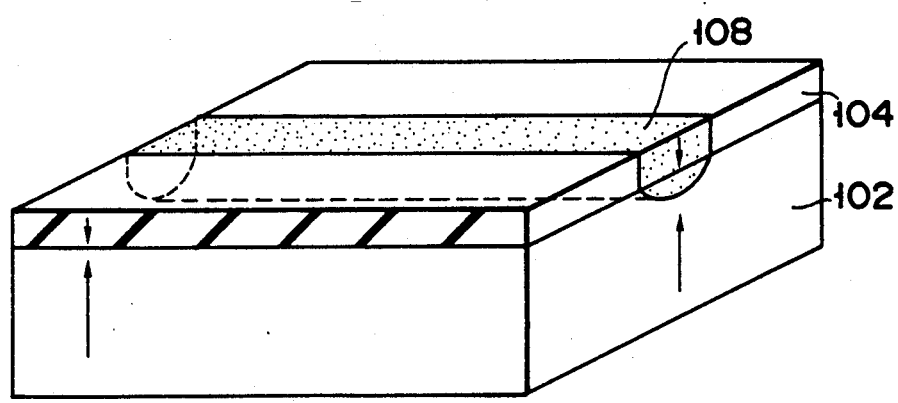
FIG. 11B is a perspective view for another type of an optical wavelength-converting device manufactured using the stacked structure produced in FIG. 10E.

Following this, an optical waveguide layer 108 is formed by using the proton exchange technique or the like at a temperature of nearly 230° C. so as to match variations in the refractive index with the abovedescribed conditional expression (1). Then, a complete optical wavelength-converting element is obtained as shown in FIG. 11A. While in the above embodiment, the structure of the dielectric layer is made double-layered, it may be single-layered as shown in FIG. 11B, in which case the crystal axis of the dielectric layer 104 is inverted. With this arrangement, although the conversion-efficiency contribution coefficient $\eta$ is inverted over the entire waveguide layer region of FIG. 9, the resulting conversion efficiency is sure to improve because the negative polarity integration component is larger than the positive one in the region as shown by the solid line 116. In this embodiment, the dielectric layers 104 and 106 are made using the liquid phase epitaxial technique, but other growing methods including the MOCVD and MBE techniques may be used.

With this embodiment, a domain inversion layer can be formed within the optical waveguide layer 108 by making use of the difference in the Curie temperature between the dielectric layers 104 and 106 constituting the waveguide layer 108, thereby increasing the contribution coefficient to the conversion efficiency in the waveguide layer 108. Accordingly, it is possible to fabricate an optical wave length-converting element with a high conversion efficiency.

In FIG. 12, an optical wavelength-converting device according to a sixth embodiment of the present invention is generally designated by reference character 140. Here, similar parts to those in FIG. 8 are indicated by similar reference characters and their detailed explanations are omitted.

This embodiment 140 is characterized in that dielectric buffer layers 142 and 144 are additionally formed between the top surface of the substrate 102 and the stacked dielectric layers 104 and 106. More specifically, these buffer layers 142 and 144 are stacked one on top of another, which are sandwiched between the substrate 102 and the stacked structure of dielectric layers 104 and 106. The waveguide layer 108, as with the embodiment of FIG. 8, is defined in the stacked waveguide layers 104 and 106 in the same manner as shown in FIG. 11A, for example. In FIG. 12, an arrow in each of layers 102, 104, 106, 142, and 144 represents the direction of crystal axis in a corresponding layer. The crystal axis direction of the first buffer layer 142 is opposite to that of the substrate 102, whereas the crystal axis direction of the second buffer layer 144 is the same as that of the substrate 102. Such direction setting of crystal axis in the multilayered structure can be obtained relatively easily by lowering the Curie point starting with the layer of substrate 102 upward and by performing the domain inverting processes described in the above embodiment at a specific temperature.

For the optical wavelength-converting device 140, a domain inversion even in the substrate 102 enables the contribution coefficient $\eta$ to be inverted to positive polarity as shown by broken lines 118a and 118b in the characteristic diagram of FIG. 9, which promises greater improvements in the conversion efficiency than those in the embodiment of FIG. 8.

In an optical wavelength-converting device 150 in accordance with a seventh embodiment of the present invention in FIG. 13, an optical waveguide layer 152 is composed of impurity-doped layers 154 and 156 formed, by ion implantation, directly on the top surface region of the substrate The first impurity-doped layer 154 is formed in the substrate 102 so as to have an essentially long, narrow semicylindrical shape with a preselected size The second impurity-doped layer 156 of a long, narrower semicylindrical shape is formed so as to be embedded in the first one 154. The direction of crystal axis in each of these impurity-doped layers 154 and 156 is opposite to each other as shown by arrows in the FIG. 13; the crystal axis direction in the first impurity-doped layer 154 is opposite to that of the substrate 102, while the direction of crystal axis in the second one 156 is the same as that of the substrate 102. This configuration also helps improve the conversion efficiency.

A method of manufacturing the optical wavelength-converting device 150 of FIG. 13 will be explained, refer ring to FIGS. 14A through 14D and FIG. 15. Aside from the technique of making use of a difference in crystal composition ratio, suitable adjustment of the type and amount of impurities can vary the Curie temperature in dielectric crystal This embodiment employs the domain inversion technique using ion implantation, as will be explained below.

As shown in FIG. 14A, first, regions of the substrate 102 that are not to have the domain inverted are covered with a patterned resist mask 158. Ti ions are implanted into the domain inversion region at a rate of, for example, peak concentration $1 \times 10^{18}$ cm$^{-3}$. Heat treatment is performed for an hour at nearly 800° C. to allow recrystallization and diffusion. This produces the first dielectric layer 154. At this point, the crystal axis in the ion implantation layer varies from place to place and the Curie point of the dielectric layer 154 is nearly 900° C.

Then, a metal film (not shown) is formed on the surface region including at least the first dielectric layer 154. After this, while a DC power supply 160 applies a suitable voltage across the substrate as shown in FIG. 14B (the first application of electric field), heat treatment is carried out under suitable temperature conditions (e.g., 1000° C.) that are higher than the Curie point of the dielectric layer 154 and that do not affect a domain variation in the substrate 102. As a result, domain inversion takes place in the first dielectric layer 154.

Then, as shown in FIG. 14C, formed on the resultant substrate structure is a resist mask 162 whose opening diameter is smaller than that of the resist mask 158. This is followed by the Ti-ion implantation at a rate of peak concentration $1 \times 10^{20}$ cm$^{-3}$, which forms the second dielectric layer 156. Then, as shown in FIG. 14D, with the DC power supply 160 applying a suitable voltage (the second application of electric field), heat treatment is performed under temperature conditions (e.g., 820° C.) that are higher than the Curie point of the second dielectric layer 156 but lower than that of the first dielectric layer 154. This process causes the direction 164 of crystal axis in the second dielectric layer 156 to be the same as that in the substrate 102.

After this, the optical waveguide layer 152 is formed by using the proton exchange technique or the like so as to match a variation in the refractive index with the afore mentioned conditional expression (1). Now, the optical wavelength-converting element 150 is completed. If a variation in the refractive index in the dielectric layer 154 due to ion implantation fulfills expression (1), then the proton exchange process is unnecessary.

With this embodiment, the difference in the impurity doping level between the dielectric layers 154 and 156 constituting the waveguide layer 152 helps to create domain inversion layers each having opposite directions of polarization within the waveguide layer, which increases the contribution efficient to the conversion efficiency in the optical waveguide layer 152. Thus, as with the preceding embodiment, it is possible to fabricate an optical wavelength-converting element with a high conversion efficiency.

FIG. 15 generally shows temperature variations with respect to time in the above-noted manufacturing processes. Here, a period of time A corresponds to a Ti doping process; period B the first application of electric field (FIG. 14B); period C the second Ti doping process; and period D the second electric field application. A broken line 164 indicates the Curie temperature of the buffer layer 154, while a broken line 166 represents that of the buffer layer 156.

In this embodiment, Ti-ion implantation technique is used, but other technique may be used. For example, the diffusion of impurities such as Li or Nb atoms, the neutron irradiation, and the radioactive ray irradiation, all of which lead to similar results. In addition, repetitious use of this processing may provide more buffer layers.

The optical wavelength-converting devices 100, 140, and 150, whose dielectric buffer layers are stacked and inverted in their direction of crystal axis as describe above, may be fabricated by directly controlling the Li-to-Nb ratio in performing epitaxial crystal growth during manufacturing processes, a detailed description of which will be given hereinafter.

As shown in FIG. 16, selected flux and LN material are put, mixed, and fused in a platinum crucible 170, which retains the resulting mixed solution 172. Normally, with an LN substrate 174 dipped in the solution 172, the temperature is lowered gradually to form a single-crystal layer. During the formation of a single-crystal layer from the solution, a DC power supply 176 applies a suitable electric field through a conductive supporting rod 178 to the LN substrate 174 to produce a concentration difference between positive ions 180 and negative ions 182 immediately below the LN substrate 174. In this state, gradual decrease of liquid phase temperature allows a single-crystal layer to form. In the situation of FIG. 16, Nb positive-ion concentration is higher directly below the substrate 174, which permits an LN crystal layer of a higher Nb ratio to grow. Therefore, domain inversion described in the embodiment 100 can be achieved with a better repeatability at a lower Curie point.

This method may be used in removing impurities that must not get mixed in the LN waveguide layer. In addition, during crystal growth, alternate change of the direction of electric field enables the Curie point to vary with place within the single-crystal layer. Furthermore, use of a high Curie-point substrate for epitaxial layer growth allows the direction of crystal axis in the epitaxial growth layer to be opposite to that of the substrate.

What is more, this method is applicable not only to the liquid phase epitaxial technique but also to the vapor phase epitaxial technique. Referring to FIG. 17, with the LN substrate placed on a supporting base 190, a platinum electrode 192 is forced to apply an electric field to the sub strate's surface during crystal growth. This makes it possible to control the adhesion of molecules having polarization momentum, which brings about basically the same results as those with the liquid phase epitaxial technique.

In another embodiment of the present invention shown in FIG. 18, a technique of purifying the solution for crystal growth is employed. More specifically, fused LN is kept in a platinum crucible 202. In this state, with a platinum rod 204 immersed in the fused LN 200, for example, a DC power supply 206 applies an electric field to the solution 200, which allows more positive ions to gather around the platinum rod 204. Slowly lowering the temperature in the LN solution 200 causes impurity-rich LN polycrystals to appear around the platinum rod. After the rod 204 is removed, promoting the growth of single-crystal provides a highly pure LN single-crystal.

With another platinum rod immersed in the solution and a positive electric field applied to it, similar processes described above are carried out to cause negative ion-rich LN polycrystals to appear around the platinum rod. After removal of the platinum rod, the growth of monocrystal can be made. Separate application of positive and negative electric fields using two platinum rods makes it possible to have fused LN of a high degree of purity. Accordingly, it is possible to produce an LN single-crystal usable as optical crystal.

Still another embodiment of the present invention in FIG. 19 will be explained, focusing on a method of manufacturing a high Curie LN substrate. As can be seen from FIG. 8, the second-harmonic wave generated passes through the substrate crystal and radiates from the optical wavelength-converting element. Thus, if there is any irregularity in the passage of the secondharmonic wave within the substrate crystal, such as a fluctuation in the refractive index, then the second-harmonic wave will be scattered or refracted, making it impossible to converge the light radiated from the substrate even with an optical lens. Particularly, in the case of the manufacture of LN crystal, whose threshold power level for optical damage is high, by adding MgO and the like, fluctuations in Mg concentration directly lead to fluctuations in the refractive index, making it impossible to use it as an optical substrate. A major cause of Mg concentration fluctuations is convection in the solution. Addition of MgO to the fused LN increases its viscosity, causing large thermal vibrations, not small ones, at intervals of some ten minutes to several hours. The magnitude of thermal vibrations ranges from 5° to 15° C. Owing to thermal vibration, changes in the Mg concentration develop striations at intervals of some 100 micrometers to several millimeters in the grown crystal.

It is known that such convection-caused striations in semiconductor crystal can be prevented by externally applying magnetic field or the like to suppress convection in the solution, for example. However, electric resistance of fused oxide materials such as LN is too high to be for practical use. Contrarily, with an electric field being applied to the fused LN to suppress thermal vibrations, the growth of single-crystal produces uniform LN single-crystal.

As shown in FIG. 19, fused LN 210 (400 grams) was put in a platinum crucible (50 millimeters in diameter) and heated higher than 1200° C. to keep it in a fused state. Then, with a platinum electrode 214 brought in contact with the fused LN surface A D.C. voltage of 100 V was applied to the electrode from a DC power supply 206. The surface electrode 214 had an opening 216 in its center, through which the growth was made in the direction of the C axis (crystal axis) 218 at a pulling speed of 5 millimeters/hour with a rotational speed of 5 rpm. The pulled crystal 220 with a diameter of nearly 25 millimeters had no significant striations in it, providing an optically excellent single-crystal.

Figure 20:
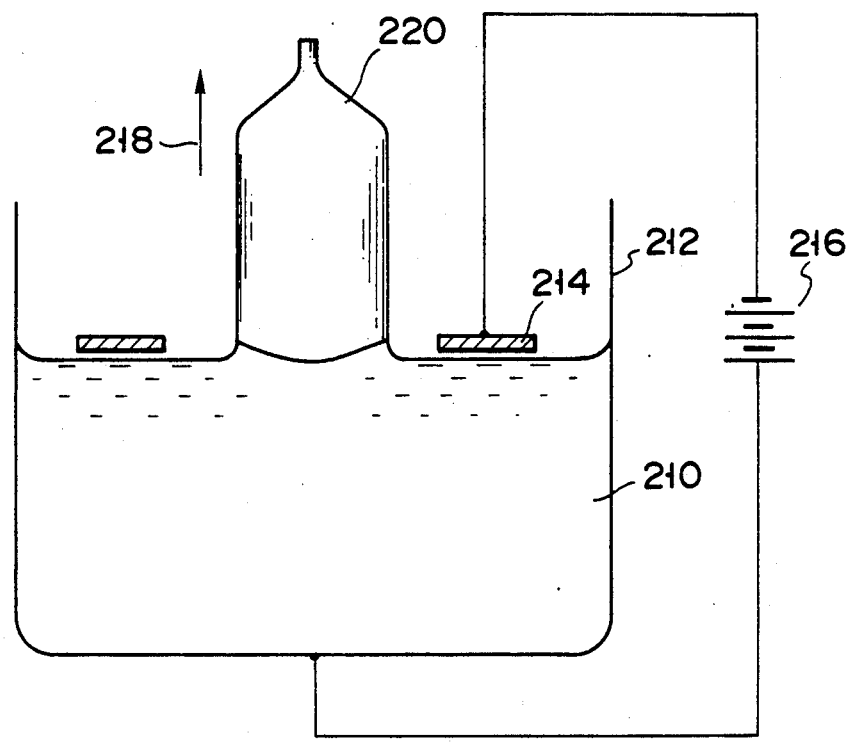
FIG. 20 is a sectional view for a major part of manufacturing equipment, which is used to explain a modification of the embodiment in FIG. 19.

As shown in FIG. 20, setting the electrode 214 one to two millimeters away from the top of the solution also reduces thermal vibrations at the solution surface, leading to good results.

The present invention is not limited to the above embodiments. In the embodiments explained so far, the description has been made, centering around LN, but the present invention may be applied to other types of dielectric crystal and nonlinear optical oxide crystal. As means for forming an optical waveguide layer, dielectric films having different domain directions may be stuck together instead of using crystal growth techniques.

This invention may be practiced or embodied in still other ways without departing from the spirit or essential character thereof.

Figure 21A:
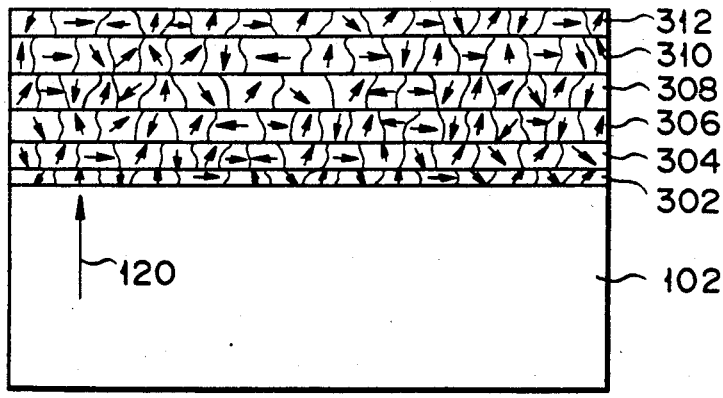
FIGS. 21A to 21D are diagrams illustrating primary sectional structures obtained from major manufacturing processes of an optical wavelength-converting device in accordance with another manufacturing method embodying the present invention.
Figure 21B:
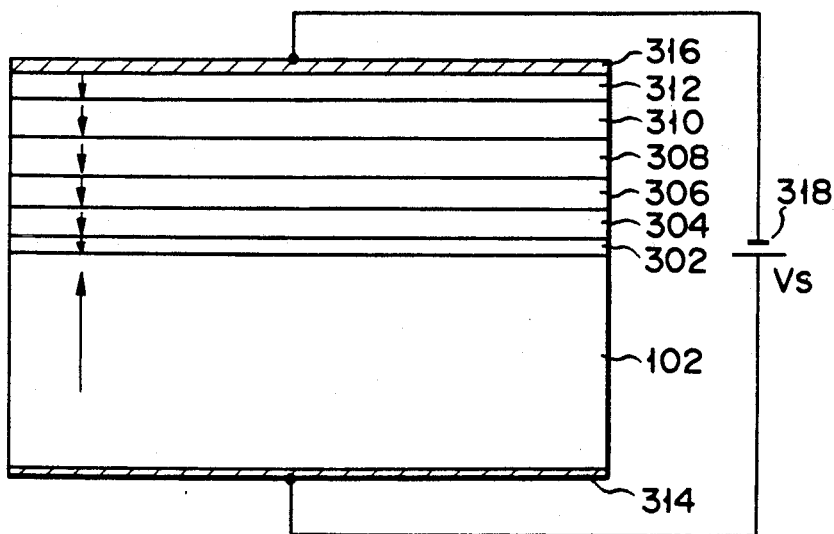
Figure 21C:
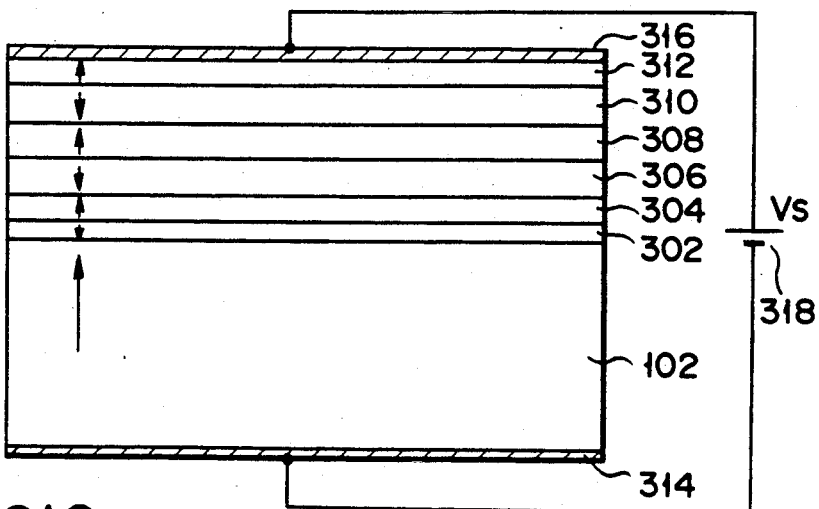

For example, the manufacturing method shown in FIGS. 10A through 10E may be modified as shown in FIGS. 21A to 21C, wherein an increased number of dielectric layers 302, 304, 306, 308, 310, and 312 are stacked sequentially on substrate 102. The method disclosed therein is featured in that the DC voltage source 126 is electrically connected to the substrate 102 and the stacked layers 302, 304, 306, 308, 310, and 312 once after all of these layers are formed on the substrate 102.

More specifically, the dielectric layers 302, 304, 306, 308, 310, and 312 which are different from one another in their Curie points are sequentially stacked on the substrate 102, as shown in FIG. 21A. The Curie points of these layers 302, 304, 306, 308, 310, and 312 are specifically arranged so that alternately positioned layers 302, 306 and 310 are lower than that of the substrate 102, and that the remaining layers 304, 308 and 312 are even lower in their Curie points than the above layers 302, 306 and 310.

Thereafter, conductive electrode layers 314 and 316 are formed on the opposite surfaces of the resultant multi-layered structure, as shown in FIG. 21B. A DC power supply 318 is connected to the electrodes 314 and 316 as shown in FIG. 21B. Thermal treatment is then performed at a specific temperature, while an electric field is created inside the multi-layered structure. The temperature is selected so as to be lower than the Curie point of the substrate 102 and yet higher than those of the layers 302, 306 and 310. As a result, all the stacked layers 302, 304, 306, 308, 310, and 312 are polarized along the same direction as shown in FIG. 21B.

The DC power supply 318 is reconnected to the structure as shown in FIG. 21C in such a manner that the voltage polarity is reversed to create an electric field of the opposite direction inside the structure. While the electric field is being applied, the second thermal treatment is then executed at a different temperature, which is so selected as to be higher than the Curie point of the layers 304, 308 and 312, and yet lower than those of the remaining layers 302, 306 and 310. With such a treatment, only the layers 304, 308 and 312 are repolarized as shown in FIG. 21C. The layers 302, 306 and 310 are polarized along the same direction as shown in FIG. 21B. As a result, alternately polarized dielectric layers 302, 304, 306, 308, 310 and 312 are obtained on the substrate 102, by performing only two steps of simultaneous thermal treatments for six-layered dielectric structure.

Figure 21D:
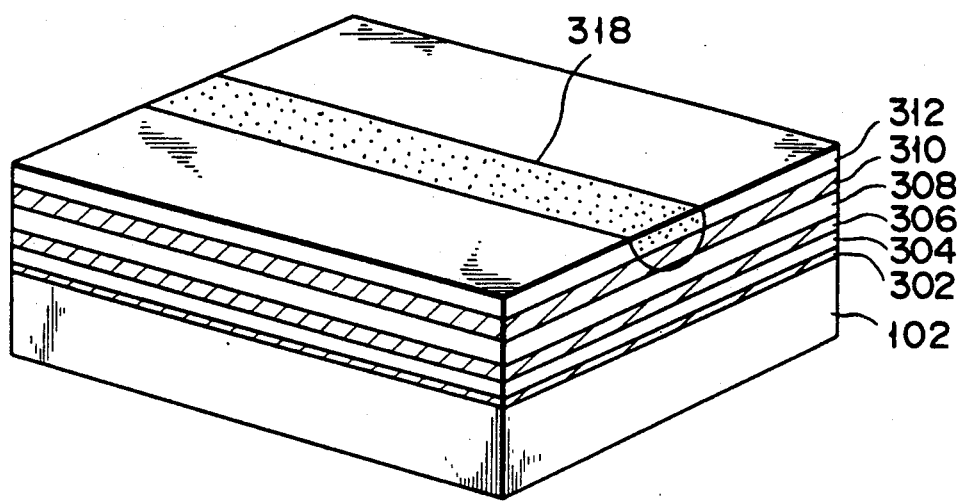

After the electrodes 314 and 316 are removed, optical waveguide structure may be formed by defining an elongated high-refractive index region 318 having a half-circular cross section in the upper section of the multi-layered dielectric structure, as shown in FIG. 21D. It should be noted in this case that the periphery of the waveguide layer is not necessarily identical with one of those contact surfaces among layers 302, 304, 306, 308, 310 and 312, and that a suitable position may be selected so as to maximize the conversion efficiency in accordance with the teaching of the experimental results shown in FIG. 9.

What is claimed is:

1. An optical device for wavelength conversion comprising:
   a substrate comprising optical crystal;
   a waveguide section formed in said substrate with its refractive index higher than that of said substrate;
   at least one of said substrate and said waveguide section having a nonlinear optical material region made from nonlinear optical crystal material; and
   compensating means for changing a nonlinear coefficient in at least part of said nonlinear optical material region to compensate for phase mismatching between a fundamental wave and a second-harmonic radiation wave.

2. The device according to claim 1, wherein said compensating means spatially changes at least one of the absolute value and sign of the nonlinear coefficient in said nonlinear optical material region.

3. The device according to claim 2, wherein said compensating means changes the absolute value of the nonlinear coefficient in said nonlinear optical material region with its sign essentially constant.

4. The device according to claim 3, wherein said substrate is made from a nonlinear optical crystal, and an additional layer which is made from a dielectric material whose nonlinear coefficient is essentially zero and which has an elongated wavelength at its top surface.

5. The device according to claim 2, wherein said compensating means changes the sign of the nonlinear coefficient in said nonlinear optical material region with its absolute value essentially constant.

6. The device according to claim 5, wherein said nonlinear optical material region comprises domain-inverted nonlinear optical crystal.

7. The device according to claim 6, wherein said nonlinear optical material region comprises a plurality of domain-inverted nonlinear optical crystal layers stacked one on top of another with a specific distance between them.

8. The device according to claim 2, wherein said compensating means changes the absolute value and sign, independently of each other, of the nonlinear coefficient in said nonlinear optical material region.

9. A device according to claim 1, wherein:
   said waveguide section extends along a selected direction and said compensating means includes layers of nonlinear material which are parallel to the selected direction, the nonlinear material of each of said layers have a nonlinear optical coefficient which specifies the nonlinear portion of the local refractive index, the sign of the nonlinear coefficient in consecutive layers of said layers of nonlinear material being opposite.

10. An optical wavelength-converting device comprising:
    a substrate made from optical crystal;
    a waveguide section having a refractive index which is larger than that of said substrate;
    at least one of said substrate and said waveguide section being made from nonlinear optical crystal material; and
    said waveguide section made of a crystalline material having a first crystal axis and being at least partially changed in a direction along the first crystal axis.

11. The device according to claim 10, wherein said waveguide section comprises:
    a dielectric layer, provided on said substrate, whose direction of crystal axis is opposite to that of said substrate.

12. The device according to claim 10, wherein said waveguide section comprises:
    a first dielectric layer, formed on said substrate, whose direction of crystal axis is opposite to that of said substrate; and
    a second dielectric layer, stacked on said first dielectric layer, whose direction of crystal axis is the same as that of said substrate.

13. The device according to claim 12, further comprising:
    a dielectric buffer section sandwiched between said substrate and first dielectric layer, said dielectric buffer section made of a crystalline material having a second crystal axis and being at least partially changed in a direction along the second crystal axis.

14. The device according to claim 12, wherein said dielectric buffer section comprises:
    a first buffer layer whose direction of crystal axis is opposite to that of said substrate; and
    a second buffer layer, stacked on said first buffer layer, whose direction of crystal axis is the same as that of said substrate.

15. The device according to claim 10, wherein said waveguide section comprises:
    a first impurity-doped layer, formed in said substrate, whose direction of crystal axis is opposite to that of said substrate; and
    a second impurity-doped layer, formed in said first impurity-doped layer, whose direction of crystal axis is the same as that of said substrate.

* * * * *